(12) United States Patent
Spitzer et al.

(10) Patent No.: US 10,843,084 B2
(45) Date of Patent: Nov. 24, 2020

(54) METHOD AND SYSTEM FOR GATHERING TIME-VARYING METRICS

(71) Applicant: Nvidia Corporation, Santa Clara, CA (US)

(72) Inventors: John Spitzer, San Jose, CA (US); Yuri Uralsky, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 839 days.

(21) Appl. No.: 14/066,904

(22) Filed: Oct. 30, 2013

(65) Prior Publication Data

US 2015/0119149 A1    Apr. 30, 2015

(51) Int. Cl.
A63F 13/77    (2014.01)
A63F 13/85    (2014.01)

(52) U.S. Cl.
CPC .......... *A63F 13/77* (2014.09); *A63F 13/85* (2014.09)

(58) Field of Classification Search
CPC ................................ A63F 13/77; A63F 13/85
See application file for complete search history.

(56) References Cited

U.S. PATENT DOCUMENTS

| | | | |
|---|---|---|---|
| 5,958,009 A * | 9/1999 | Friedrich ............ | H04L 12/2602 709/224 |
| 6,059,842 A | 5/2000 | Dumarot et al. | |
| 6,233,531 B1 * | 5/2001 | Klassen .............. | G06F 11/3466 702/180 |
| 8,296,781 B1 | 10/2012 | Lebaredian et al. | |
| 8,908,987 B1 | 12/2014 | Krishnaswamy et al. | |
| 8,943,177 B1 * | 1/2015 | Peters ................. | G06F 11/3452 709/221 |
| 9,507,887 B1 * | 11/2016 | Wang .................. | G06F 17/5009 |
| 2004/0064293 A1 * | 4/2004 | Hamilton ............ | G06F 11/3409 702/182 |
| 2005/0027858 A1 * | 2/2005 | Sloth ................... | H04L 12/2602 709/224 |
| 2006/0041497 A1 * | 2/2006 | Huber .................... | G06Q 40/04 705/37 |
| 2006/0265192 A1 * | 11/2006 | Turicchi, Jr. ........ | G06F 11/3409 702/187 |

(Continued)

*Primary Examiner* — Corbett B Coburn
(74) *Attorney, Agent, or Firm* — Shook, Hardy & Bacon, LLP

(57) ABSTRACT

Embodiments of the present invention provide a novel solution which can be used to detect and analyze instances of micro stutter within a given game, GPU and/or driver version. Embodiments of the present invention may be operable to divide an application session into a set of sub-sessions and perform multiple derivative calculations on time-varying application parameters (e.g., frame rates) measured during each sub-session. Embodiments of the present invention may also be operable to generate separate histograms for each derivative calculation performed. As such, based on calculations performed, embodiments of the present invention may synchronously increment histogram bins representing a corresponding range of performance in real-time. Upon the completion of the application session, sub-session histograms may be compressed and then saved into a log which can be fetched and uploaded to a host computer system for aggregation and storage into a database for server-side optimization analysis.

13 Claims, 9 Drawing Sheets

(56) References Cited

U.S. PATENT DOCUMENTS

| | | | |
|---|---|---|---|
| 2007/0294673 A1* | 12/2007 | Guerrera | G06F 11/3419 717/130 |
| 2008/0021994 A1* | 1/2008 | Grelewicz | G06F 11/3428 709/224 |
| 2008/0033696 A1* | 2/2008 | Aguaviva | G06F 11/3423 702/186 |
| 2008/0141131 A1 | 6/2008 | Cerny et al. | |
| 2008/0226178 A1 | 9/2008 | Penke et al. | |
| 2008/0235075 A1* | 9/2008 | Couture | G06F 11/3495 709/224 |
| 2008/0293499 A1 | 11/2008 | Brewer et al. | |
| 2011/0018884 A1* | 1/2011 | Ritts | G06F 11/32 345/522 |
| 2011/0244879 A1* | 10/2011 | Siomina | G01S 5/0268 455/456.1 |
| 2012/0137238 A1* | 5/2012 | Abeln | G06F 3/04847 715/771 |
| 2012/0209571 A1* | 8/2012 | Peterson | G06F 11/3616 702/186 |
| 2012/0239786 A1* | 9/2012 | Repasi | H04L 12/6418 709/219 |
| 2013/0052959 A1* | 2/2013 | Rubin | H04W 24/08 455/67.11 |
| 2014/0011581 A1 | 1/2014 | Spitzer et al. | |
| 2014/0089525 A1* | 3/2014 | Cardon | G06Q 30/0204 709/247 |
| 2015/0002681 A1 | 1/2015 | Gong et al. | |
| 2015/0154934 A1 | 6/2015 | Spitzer et al. | |

* cited by examiner

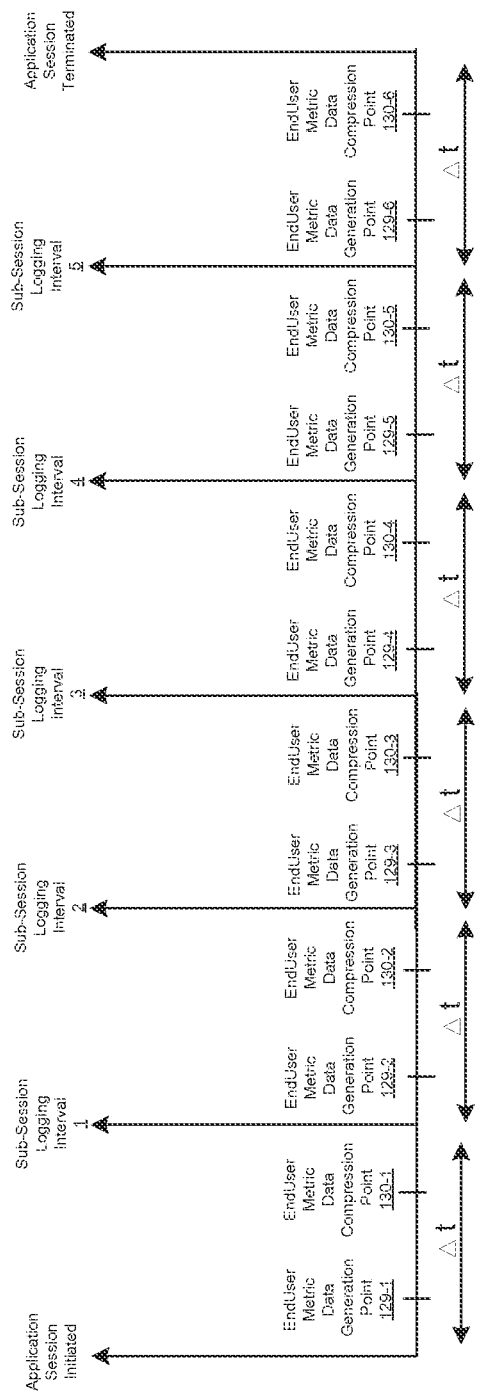

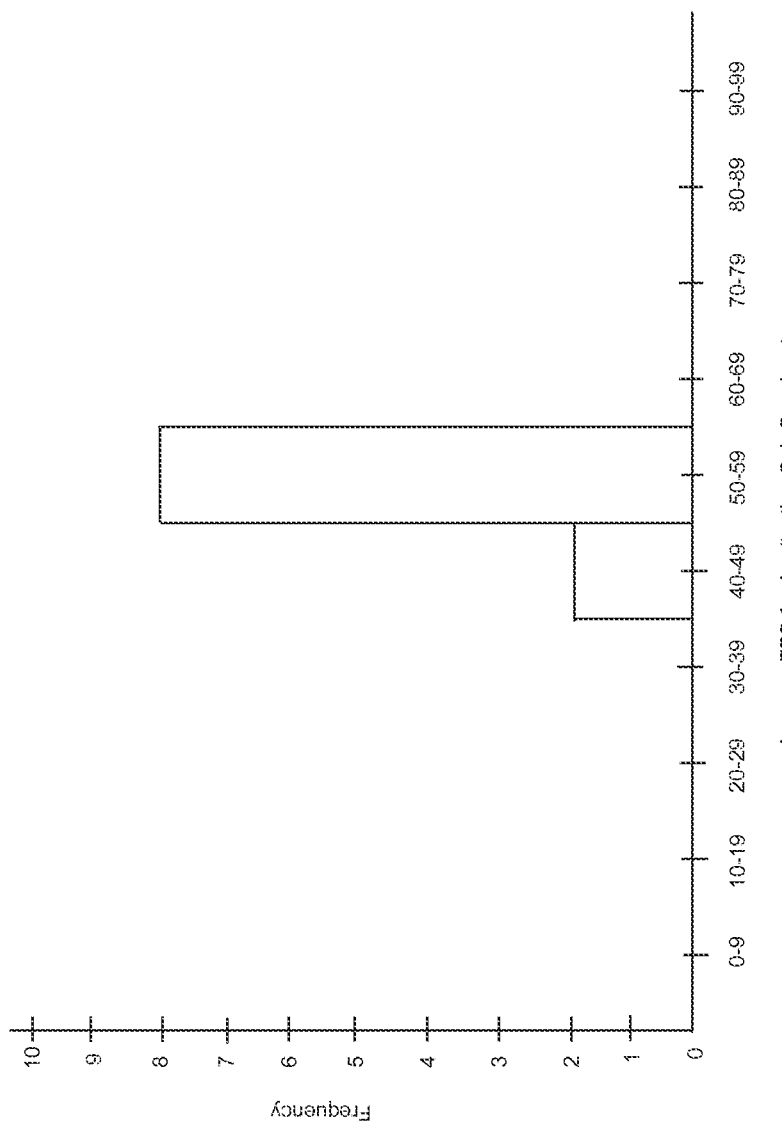

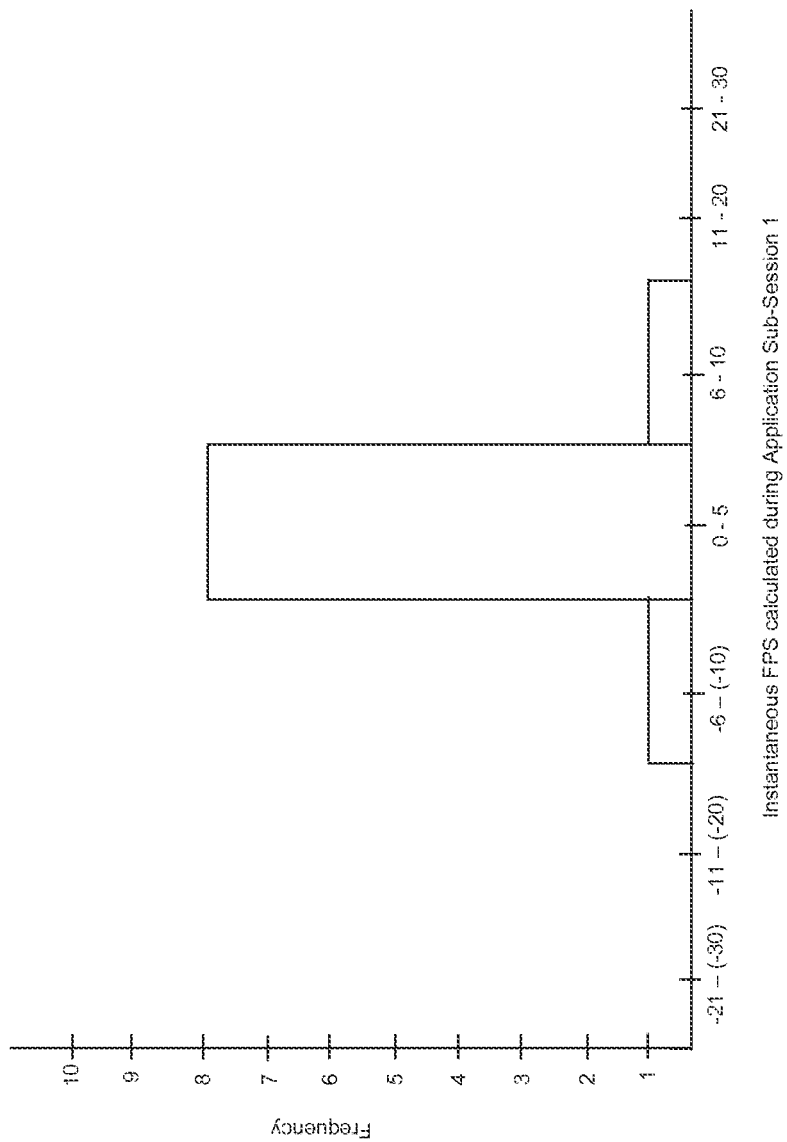

METHOD AND SYSTEM FOR GATHERING TIME-VARYING METRICS

FIELD OF THE INVENTION

Embodiments of the present invention are generally related to the field of graphics processing.

BACKGROUND OF THE INVENTION

End-user metrics are increasingly being collected and aggregated for purposes of improving an end-user's experience when executing an application. For example, when executing a video game, conventional methods of data gathering collect end-user metric data, e.g., computer performance executing an application, from the user's gaming system for server-side analysis to gain perspective on the end-user's gaming experience. As such, gathering performance data in this manner may be beneficial for purposes analyzing aspects of the video game's execution which degrade the quality of the user's gaming experience, such as the occurrence of micro stutter within the game.

However, when collecting end-user metrics, these conventional methods generally gather far too much data than can be deployed on a user base of millions of customers. Furthermore, in some instances, the data gathered may be too lossy for purposes of analysis and determining an optimal configuration for improving end-user experience when executing a particular application on a particular computer system.

SUMMARY OF THE INVENTION

Accordingly, a need exists for a solution that enables end-user metric data to be gathered in a more effective and efficient manner. Embodiments of the present invention provide a novel solution which can be used to detect and analyze instances of micro stutter within a given game, GPU and/or driver version. Embodiments of the present invention may be operable to divide an application session into a set of sub-sessions and perform multiple derivative calculations on time-varying application parameters (e.g., frame rates) measured during each sub-session. Embodiments of the present invention may also be operable to generate separate histograms for each derivative calculation performed. As such, based on calculations performed, embodiments of the present invention may synchronously increment histogram bins representing a corresponding range of performance in real-time. Upon the completion of the application session, sub-session histograms may be compressed and then saved into a log which can be fetched and uploaded to a host computer system for aggregation and storage into a database for server-side optimization analysis.

More specifically, in one embodiment, the present invention is implemented as a method of gathering performance data. The method includes, using a client device, dividing an application session associated with an application into a set of sub-sessions. The method also includes measuring a time-varying parameter associated with the application by gathering performance data associated with the time-varying parameter over time during each sub-session of the set of sub-sessions on the client device. In one embodiment, the time-varying parameter is associated with a frame rate. In one embodiment, the time-varying parameter is associated with a power consumption rate.

In one embodiment, the measuring further includes performing a first derivative calculation on the performance data, in which the first derivative calculation produces a first rate of performance for the time-varying parameter and sorting the first rate of performance into the histogram. In one embodiment, the measuring further includes performing a second derivative calculation using data associated with the first rate of performance to produce a second rate of performance, in which the second rate of performance is an acceleration rate associated with the time-varying parameter and sorting the first rate of performance into the histogram.

Furthermore, the method includes sorting the performance data for each sub-session using a histogram. In one embodiment, the sorting further includes synchronously incrementing a histogram bin in real-time responsive to the performance data gathered. In one embodiment, the method includes communicating the histogram for receipt by a host computer system over a communications network for analysis procedures.

In one embodiment, the present invention is implemented as a system for gathering performance data. The system includes a data gathering module operable to divide an application session associated with an application into a set of sub-sessions, in which the data gathering module is operable to measure a time-varying parameter associated with the application by gathering performance data associated with the time-varying parameter over time during each sub-session of the set of sub-sessions on a client device. In one embodiment, the time-varying parameter is associated with a frame rate. In one embodiment, the time-varying parameter is associated with a power consumption rate.

In one embodiment, the data gathering module is further operable to perform a first derivative calculation on the performance data, in which the first derivative calculation produces a first rate of performance for the time-varying parameter and the histogram generation module sorts the first rate of performance into the histogram. In one embodiment, the data gathering module is further operable to perform a second derivative calculation using data associated with the first rate of performance to produce a second rate of performance, in which the second rate of performance is an acceleration rate associated with the time-varying parameter and the histogram generation module sorts the first rate of performance into the histogram.

The system also includes a histogram generation module operable to sort the performance data for each sub-session into a histogram. Furthermore, the system includes a log generation module operable to log data gathered by the data gathering module and the histogram generation module. In one embodiment, the histogram generation module is further operable to synchronously increment a histogram bin in real-time responsive to the performance data gathered. In one embodiment, the system includes a communicating module operable to communicate the histogram for receipt by a host computer system over a communications network for optimization procedures.

In one embodiment, the present invention is implemented as a method of communicating analyzed configurations for an application. The method includes, using a host device, receiving a set of performance data from a plurality of client devices over a communications network, in which the set of performance data comprises a set of application sub-session data measuring a time-varying parameter associated with the application. In one embodiment, the receiving further includes receiving a set of histogram data associated with the set of performance data provided by each client device of the plurality of client devices. In one embodiment, the receiving further comprises receiving a set of metadata from each client device of the plurality of client devices, in which the set of metadata comprises hardware configuration information associated with the client device. In one embodiment, the time-varying parameter is associated with a frame rate. In one embodiment, the time-varying parameter is associated with a power consumption rate.

The method also includes generating analyzed configurations for executing the application on the plurality of client devices responsive to the set of performance data, in which the analyzed configurations are for importing execution of the application. Furthermore, the method includes communicating the optimal configurations for receipt by the plurality of client devices over the communications network. In one embodiment, the generating further includes determining a different analyzed configuration for each client device of the plurality of client devices using hardware configuration information and/or software configuration information associated with the client device.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1A depicts an exemplary metric data gathering process performed by a client device in accordance with embodiments of the present invention.

FIG. 1C is a graphical representation of an exemplary histogram generated by a client device responsive to derivative calculations performed by the client device in accordance with embodiments of the present invention.

FIG. 1D is another graphical representation of an exemplary histogram generated responsive to derivative calculations performed by the client device in accordance with embodiments of the present invention.

DETAILED DESCRIPTION

Figure 1B:
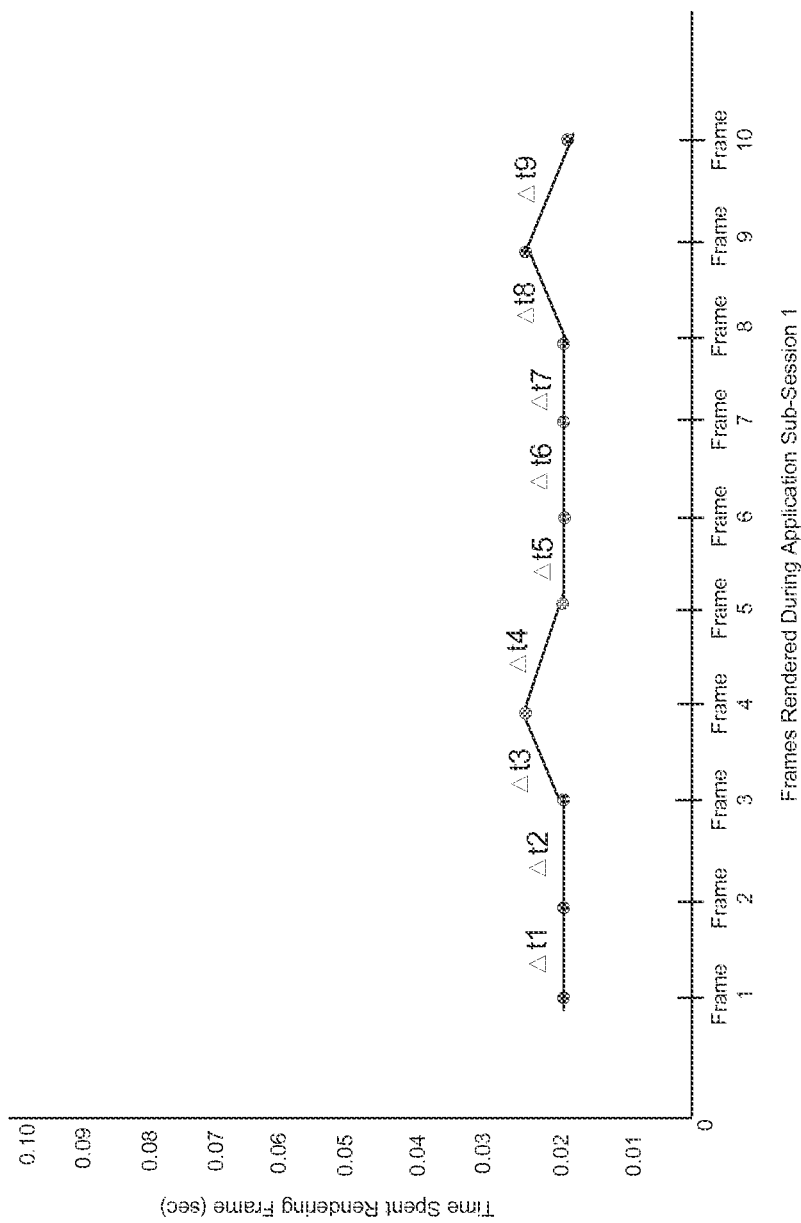
FIG. 1B is a graphical representation of exemplary derivative calculations performed on a client device during an application sub-session in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 4 and 5) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, a subject, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon. Also, as used in this application, the term "contact" is intended to refer to any party that may be have a connection to a user, which may include, but is not limited to, an associate, relative, friend, acquaintance, or any connections of the like.

FIG. 1A is a diagram of an exemplary end-user metric gathering process performed in accordance with embodiments of the present invention. FIG. 1A illustrates how client devices may be capable of gathering and/or storing end-user metric data for an executed application (e.g., video game). According to one embodiment, end-user metric data may include a set of different application parameters calculated by a client device for executing an application in which each parameter represents a different application characteristic. For example, data gathered during end-user metric data generation points 129-1, 129-2, 129-3, 129-4, 129-5, and 129-6 may include time-varying performance parameters (e.g. frames/second or "FPS") calculated by the client device for executing an application over the course of an application session. In one embodiment, end-user metric data may also include various static parameters associated with the application (e.g., application identification values, metadata of in-application settings, etc.).

According to one embodiment, end-user metric data may be calculated by client devices in intervals of time by dividing an application session into a set of application sub-sessions. In one embodiment, sub-session lengths may be a predetermined value, in which sub-sessions may be of equal length or of varying length. For example, with reference to the FIG. 1A illustration, a client device may be configured to divide an hour-long application session (e.g., 3600 seconds) into six ten-minute intervals (e.g., sub-session logging intervals 1-5) in which each sub-session is 10 minutes in duration (e.g., 600 seconds). As such, in on embodiment, metric data gathered during each sub-session may be then subsequently compressed (e.g., during end-user metric data compression points 130-1, 130-2, 130-3, 130-4, 130-5, 130-6) and stored within a log file resident on the client device (e.g., sub-session logging intervals 1-5).

According to one embodiment, client devices may calculate rendering times for a set of frames rendered during an application sub-session. Within each sub-session, in one embodiment, a client device may be operable to perform multiple derivative calculations on the set of rendered frames for purposes of detecting and analyzing instances of micro stutter within the application session. In one embodiment, derivative calculations may use recorded time stamps associated with each rendered frame.

For example, FIG. 1B is a graphical representation of exemplary derivative calculations (e.g., first derivative calculations) performed by a client device on a set of rendered frames during an application sub-session (e.g., Application Sub-Session 1) in accordance with embodiments of the present invention. Application Sub-Session 1 may represent a sample set of frames rendered by the client device during a 600 second (e.g. 10-minute) sub-session within an hour-long application session (e.g., 3600 seconds). As such, Application Sub-Session 1 may be the first sub-session of 10 sub-sessions processed by the client device.

As illustrated in FIG. 1B, a client device may be configured to perform a first derivative calculation using rendered times associated with rendered frames 1 through 10. As such, the client device may calculate rendering time differences between a previous frame and a current frame (e.g., Δt1, Δt2, Δt3, etc.). For example, based on a frame rendering time of 0.02 seconds calculated for frames 1, 2, 3, 5, 6, 7, 8 and 10, the client device may calculate a rate of 50 FPS for these frames. Also, based on a frame rendering time of 0.025 calculated for frames 4 and 9, the client device may calculate a rate of 40 FPS for these frames. Accordingly, rendering times and/or FPS rate calculations performed by the client device may be recorded and stored within a log file resident on the client device.

Furthermore, with further reference to FIG. 1B, in one embodiment, the client device may be configured to client device may be configured to perform a second derivative calculation to determine frame rate accelerations and/or decelerations within the application sub-session (e.g., Application Sub-Session 1). For instance, as described supra, the client device may calculate a rate of 50 FPS for frame 3 and a rate of 40 FPS for frame 4. Based on the difference calculated between frames 3 and 4 (e.g., Δt3), the client device may calculate a deceleration of approximately −10 FPS/S. Similarly, as described supra, the client device may calculate a rate of 40 FPS for frame 4 and a rate of 50 FPS for frame 5. Based on the difference calculated between frames 4 and 5 (e.g., Δt4), the client device may calculate an acceleration of approximately +10 FPS/S. Accordingly, derivative calculations performed by the client device may be recorded and stored within the log file resident on the client device.

Embodiments of the present invention may also be operable to synchronously sort end-user metric data gathered in real-time responsive to calculations performed on time-varying parameters measured during an application session. As such, in one embodiment, client devices may be operable to generate and update (e.g., increment) histogram representations that represent the results of the time-varying parameters or any additional derivative calculations performed by the client device for each application sub-session.

For example, according to one embodiment, client devices may be operable to generate histogram representations for measured parameter calculations (e.g., frames/second or "FPS") performed by the client device during an application session. As such, histogram data generated by client devices for FPS calculations may be recorded and stored within a log file resident on the client device. Additionally, according to one embodiment, client devices may be operable to generate separate histogram representations for each derivative calculation performed by the client device. As such, these histograms may provide detailed information for use in micro stutter detection and analysis for a given application session (or sub-session). Accordingly, histogram data generated by client devices may be recorded and stored within a log file resident on the client device.

FIG. 1C presents an exemplary graphical depiction of a histogram generated by a client device during an application sub-session in accordance with embodiments of the present invention. The histogram presented in FIG. 1C may represent measured time-varying parameters or first derivative calculations performed by a client device using data associated with FIG. 1B. As illustrated in FIG. 1C, in response to FPS rates calculated for each frame during each sub-session, the client device may synchronously increment histogram "bins" that represent a range of performance (e.g., 0-9 FPS, 10-19 FPS, 20-29 FPS, 30-39 FPS, 40-49 FPS, 50-59 FPS, 60-69 FPS, 70-79 FPS, 80-89 FPS or 90-99 FPS) in real-time.

For instance, given that the FPS rates calculated during Application Sub-Session 1 were within the performance range of 40 FPS two times and in the 50 FPS eight times, the client device may correspondingly increment histogram "bins" representing those respective frequencies (e.g., 40-49 and 50-59 FPS bins). Accordingly, based on the data provided by the histogram depicted in FIG. 1C, an evaluator (e.g., a host system) capable of reading the histogram data generated by the client device may detect instances of micro stutter during Application Sub-Session 1 (e.g., within the periods in which the client device operated at 40 FPS).

Furthermore, with further reference to FIG. 1D, the client device may be configured to generate a separate histogram for second derivative calculations performed by the client device that depicts frame rate accelerations and/or decelerations within the application sub-session (e.g., Application Sub-Session 1). The histogram presented in FIG. 1D may represent second derivative calculations performed by a client device using data associated with FIG. 1B. As illustrated in FIG. 1D, using frame rate accelerations/decelerations calculated during Application Sub-Session 1, the client device may synchronously increment histogram "bins" that represent a range of deceleration periods (e.g., −21 through −30 FPS, −11 through −20 FPS, −6 through −10 FPS) as well as a range of acceleration periods (e.g., 0 through 5 FPS, 6 through 10 FPS, 11 through 20 FPS, 21 through 30 FPS) in real-time during Application Sub-Session 1.

For instance, given the instances of decelerated frame rates that occurred during Application Sub-Session 1 (e.g., −10 FPS/S), the client device may synchronously increment a histogram "bin" that represents that range of performance (e.g., −6 through −10 bin). Similarly, given the instances of accelerated frame rates that occurred during Application Sub-Session 1 (e.g., +10 FPS/S), the client device may synchronously increment a histogram "bin" that represents that range of performance (e.g., +6 through +10 bin). In this manner, an evaluator (e.g., a host system) capable of reading the histogram data generated by the client device may be able to gather more detailed information regarding instances of micro stutter during Application Sub-Session 1.

Although FIGS. 1C and 1D depict first and second derivative calculations performed by the client device, client devices may be configured to generate additional histogram representations based on additional derivative calculations performed by the client device (e.g., a third histogram for third derivative calculations, fourth histogram for fourth derivative calculations, etc.). Furthermore, according to one embodiment, client devices may be configured to gather other time-varying performance parameters associated with the client device. For example, time-varying parameters associated with a client device may include power consumption metrics (e.g., power saving states, power drawn by the client device when rendering frames for an application, etc.) gathered over a period of time. In one embodiment, time-varying parameters may also include temperature, fan speed, and/or other hardware specific metrics associated with the client device.

Embodiments of the present invention may also be operable to communicate end-user metric data (e.g., time-varying measurement data, static hardware configuration data, etc.) gathered by a plurality of client devices to a remote host computer system upon the completion of an application session. As such, in one embodiment, sub-session histograms generated by client devices may be fetched and uploaded to the host computer system for aggregation and storage into a database for server-side optimization analysis. In one embodiment, host computer systems may be configured to receive end-user metric data from client devices during fixed time periods or varying time periods.

Figure 1E:
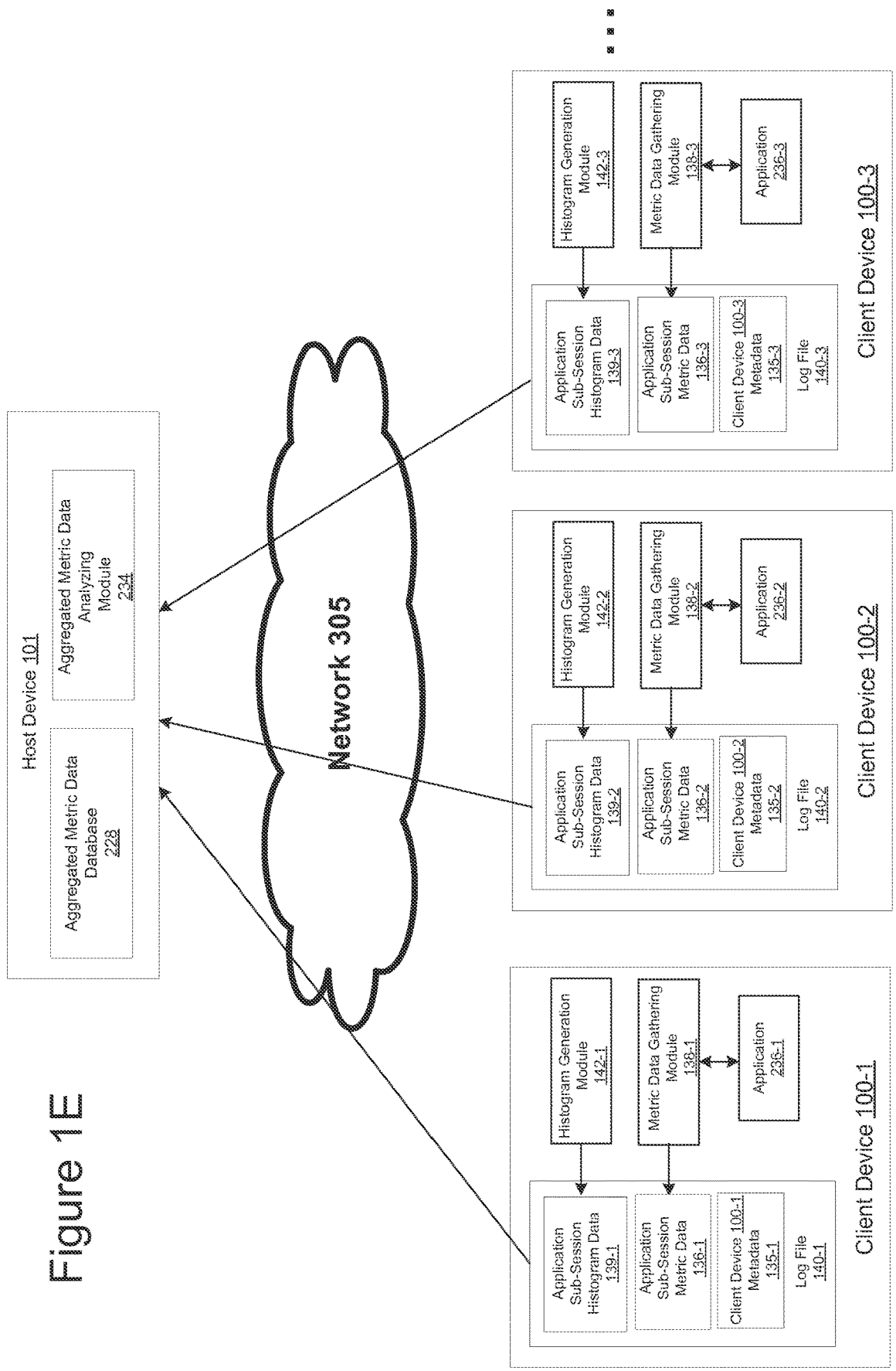
FIG. 1E presents an illustration of a method of remote communication depicting the flow of data between client devices and a host device in accordance to embodiments of the present invention.

For example, FIG. 1E provides an exemplary network communication between host device 101 and remote client devices 100-1, 100-2 and 100-3 in accordance with embodiments of the present invention. In one embodiment, client devices 100-1, 100-2 and/or 100-3 may represent different hardware and/or software profiles (e.g., e.g., different hardware configuration parameters, operating system, applications resident on each client device, etc.). As illustrated by the embodiment depicted in FIG. 1E, host device 101 may periodically receive log files (e.g., log files 140-1, 140-2, 140-3) stored locally on client devices 100-1, 100-2, and 100-3 over a communications network (e.g., network 305). In this manner, host device 101 may be operable to receive application sub-session data associated with an application (e.g. application 236) from each device. Applications 236-1, 236-2, and 236-3 may be separate instantiations of the same application (e.g., application 236). In one embodiment, applications 236-1, 236-2, and 236-3 may be different applications.

As illustrated in FIG. 1E, log files received by host device 101 may include histogram data associated with the execution of an application 236 (e.g., application sub-session histogram data 139-1, 139-2, 139-3, etc.) from a plurality of client devices over a communication network. In one embodiment, application sub-session histogram data 139-1, 139-2, and/or 139-3 may additional histograms that depicting the various different derivative calculations performed by the client device. Additionally, host device 101 may receive metric data used to generate histogram data (e.g., application sub-session metric data 136-1, 136-2, 136-3, etc.) from each client device over the communication network. Furthermore, host device 101 may receive metadata from each client device (e.g., client device metadata 135-1, client device metadata 135-2, client device metadata 135-3, etc.). For example, in one embodiment, metadata may include definitions concerning application game settings, hardware configuration information (e.g., version information, hardware setting information, etc.), software configuration information (e.g., operating system) and the like.

Embodiments of the present invention may also be operable to use data received from client devices to determine acceptable and/or unacceptable performance levels for an application. As such, embodiments of the present invention may be operable to use aggregated histogram data gathered from client devices to perform acceptability tests based on a particular hardware and/or software configuration associated with a particular client device. Furthermore, embodiments of the present invention may be capable of determining recommended optimal configuration settings for executing an application on a client device based on acceptability tests performed.

For instance, with further reference to FIG. 1E, log files received from each client device may be aggregated and stored within a database resident on host device 101 (e.g., aggregated metric data database 228). As such, host device 101 may use data received from log files to determine acceptable and/or unacceptable performance levels for an application (e.g., application 236). For example, host device 101 may perform acceptability tests (e.g., via aggregated metric data analyzing module 234) using aggregated sub-session histogram data received from client devices 100-1, 100-2, and/or 100-3. In one embodiment, host device 101 may also use data provided by sub-session metric data and/or metadata received from client devices 100-1, 100-2, and/or 100-3 to perform acceptability tests. Also, in one embodiment, acceptable and/or unacceptable performance level determinations made by host device 101 may include subject feedback provided by users (e.g., user-defined minimum acceptable FPS rate for a hardware and/or software configuration associated with the client device used by the user).

As such, host device 101 may be capable of determining recommended optimal configuration settings for executing an application (e.g., application 236-1, 236-2, 236-3, etc.) on each client device (e.g., client devices 100-1, 100-2, and/or 100-3) with respect to the client device's hardware and/or software configuration. Furthermore, in one embodiment, host device 101 may be capable of communicating or broadcasting the recommended optimal configuration settings to each client device over communications network 305.

Exemplary Client Device

Figure 2:
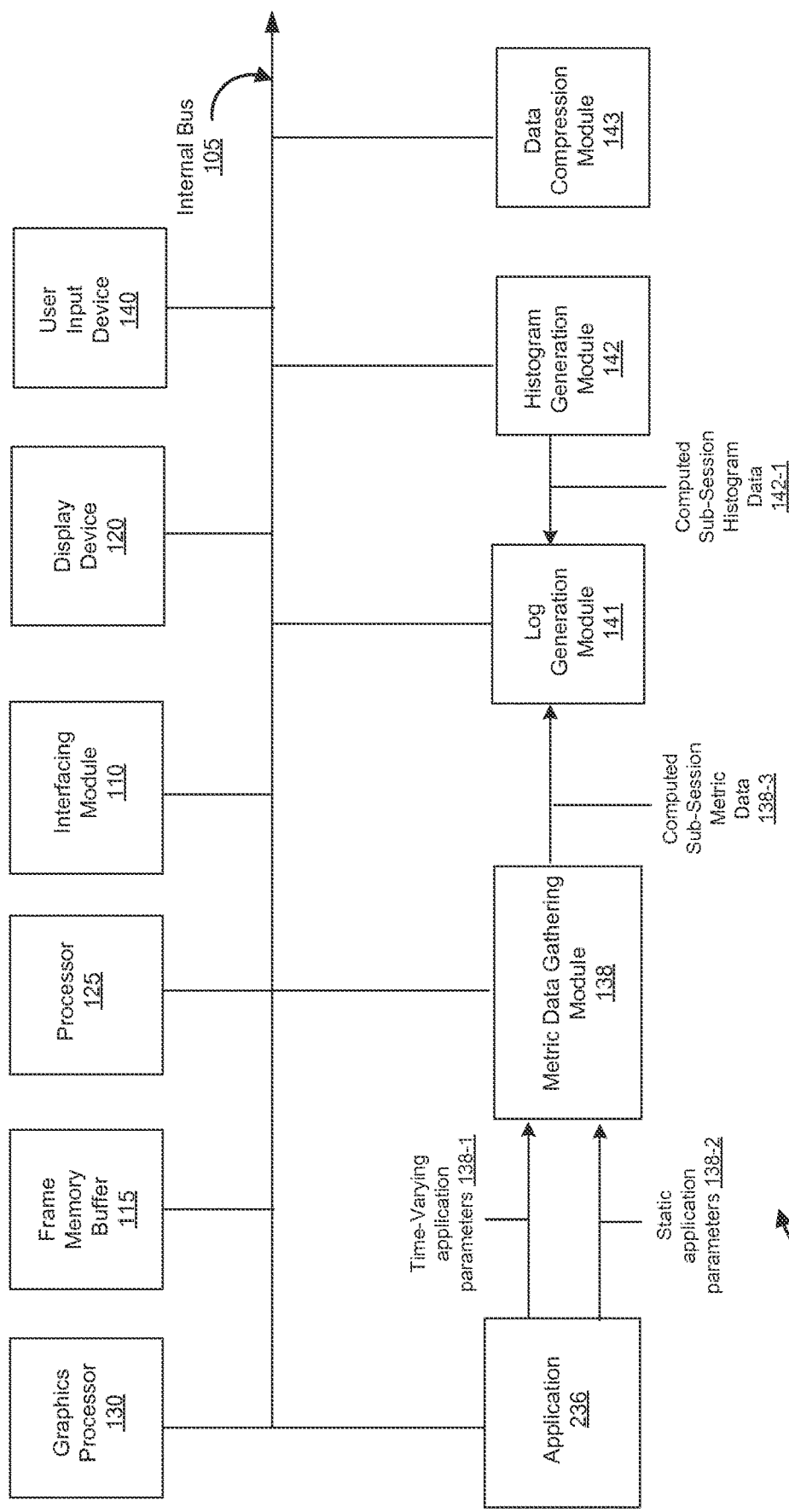
FIG. 2 depicts an exemplary client device capable of gathering end-user metric data in accordance with embodiments of the present invention.

As presented in FIG. 2, an exemplary client device 100 upon which embodiments of the present invention may be implemented is depicted. Client device 100 may be implemented as an electronic device (e.g., desktop computers, laptop computers, tablet PCs, smartphones, etc.) capable of communicating with other computer systems. Furthermore, client device 100 may be any type of device that has the capability to receive inputs from a user and send such inputs to a host computer system (e.g., host device 101). According to one embodiment, client device 100 may include metric data gathering module 138, log generation module 141, histogram generation module 142, data compression module 143, graphics processor 130, frame memory buffer 115, user input device 140, processor 125, display device 120, and interfacing module 110. According to one embodiment, some or all of the components of client device 100 (e.g., metric data gathering module 138, log generation module 141, histogram generation module 142, data compression module 143, graphics processor 130 and/or frame memory buffer 115) may be included as part of a graphics system (e.g., graphics driver) residing in memory within client device 100.

Metric data gathering module 138 may include the functionality to gather end-user metric data from an application (e.g., application 236) executed on client device 100. In one embodiment, metric data gathering module 138 may be configured to gather data associated with a set of different application parameters, in which each parameter represents a different application characteristic. For example, according to one embodiment, metric data gathering module 138 may be configured to gather time-varying performance parameters (e.g. time-varying application parameters 138-1) associated with application 236.

According to one embodiment, metric data gathering module 138 may be configured to measure time-varying performance parameters for the duration of an application session in intervals by dividing an application session into a set of application sub-sessions. In one embodiment, sub-session lengths may be a predetermined value, in which sub-sessions may be of equal length or of varying length. For instance, in one embodiment, time-varying performance parameters measured by metric data gathering module 138 may include frames issued by application 236 for processing by the graphics system of client device 100 (e.g., graphics processor 130, frame memory buffer 115, etc.). In one embodiment, time-varying performance parameters measured by metric data gathering module 138 may include frames issued by application 236 that were actually displayed on display device 120.

Within each sub-session, according to one embodiment, metric data gathering module 138 may be configured to perform multiple derivative calculations (e.g., first derivative, second derivative, etc.) for purposes of detecting and analyzing instances of micro stutter within a given application session. In one embodiment, metric data gathering module 138 may perform derivative calculations using recorded time stamps information. Furthermore, derivative calculations performed by metric data gathering module 138 may be recorded within a log file generated by log generation module 141. In one embodiment, metric data gathering module 138 may compress processed data via data compression module 143 prior to communicating data to log generation module 141. As such, data compression module 143 may include the functionality to compress data received from components of client device 100 (e.g., metric data gathering module 138, histogram generation module 142, etc.) using conventional methods of data compression. Additionally, according to one embodiment, metric data gathering module 138 may include the functionality to gather various static parameters associated with application 236 (e.g., static application parameters 138-2). For instance, static application parameters gathered by metric data gathering module 138 may include, but are not limited to, application identification values, metadata of in-application settings, etc.

According to one embodiment, metric data gathering module 138 may be configured to gather time-varying performance parameters associated with client device 100. For example, time-varying parameters associated with client device 100 may include power consumption metrics (e.g., power saving states, power drawn by client device 100 when rendering frames for an application, etc.) gathered over a period of time. In one embodiment, time-varying parameters may also include temperature, fan speed, and/or other hardware specific metrics associated with the client device. Also, in one embodiment, metric data gathering module 138 may include the functionality to gather various static parameters associated with client device 100. For instance, static application parameters associated with client device 100 may include, but are not limited to, operating system, applications resident on client device 100, etc.

Histogram generation module 142 may include the functionality to generate real-time histogram representations based on data collected by metric data gathering module 138. For example, in one embodiment, histogram generation module 142 may be configured to generate a histogram for a set of sub-sessions analyzed by metric data gathering module 138 (e.g., computed sub-session histogram data 142-1). As such, according to one embodiment, histogram generation module 142 may be configured to update (e.g., increment) histogram representations based on calculations performed by metric data gathering module 138 during each sub-session analyzed. For example, in one embodiment, histogram generation module 142 may include the functionality to increment histogram "bins" (e.g., using counters) that represent a range of performance in a synchronous manner with respect to derivative calculations performed by metric data gathering module 138. Furthermore, according to one embodiment, histogram generation module 142 may be configured to generate additional histogram representations based on any additional derivative calculations performed by metric data gathering module 138 (e.g., a third histogram for third derivative calculations, fourth histogram for fourth derivative calculations, etc.).

Interfacing module 110 may include the functionality to communicate with other computer systems (e.g., host device 101) via an electronic communications network (e.g., network 305), including wired and/or wireless communication and including the Internet. According to one embodiment, interfacing module 110 may be configured to communicate log files generated by log generation module 141. In one embodiment, interfacing module 110 may be configured to communicate data between client device 100 and other computer systems (e.g., host device 101) over a communications network during fixed time periods or varying time periods. In one embodiment, interfacing module 110 may be configured to communicate data compressed by data compression module 143.

Log generation module 141 may include the functionality to generate log files based on data received from metric data gathering module 138 and/or histogram generation module 142. As such, log generation module 141 may be configured to record and/or store derivative calculations performed by metric data gathering module 138 and/or histogram data generated by histogram generation module 142. Additionally, in one embodiment, log generation module 141 may be configured to record and/or store additional histograms (e.g., multiple derivative histograms) generated by histogram generation module 142.

Furthermore, in one embodiment, log generation module 141 may include the functionality to produce metadata within the log files generated. Metadata created by log generation module 141 may include the definitions of various parameters associated with application 236 and/or hardware configurations associated with client device 100. For example, in one embodiment, metadata created by log generation module 141 may include definitions concerning application game settings, hardware configuration information (e.g., version information, hardware setting information, etc.) and the like.

Processor 125 may include the functionality to read and process instructions for running software applications and optionally an operating system. User input device 140 may be a device capable of receiving user input including, but not limited to, a keyboard, mice, joystick, and/or touch screen display, or the like. Furthermore, display device 120 may include the functionality to display output. Examples of display device 120 may include, but are not limited to, a liquid crystal display (LCD), a plasma display, cathode ray tube (CRT) monitor, etc.

Graphics processor 130 may be operable to process instructions from applications resident on client device 100 (e.g., rendering requests made by application 236) and to communicate data with processor 125 via internal bus 105 for rendering the data on display device 120. Graphics processor 130 generates pixel data for output images from rendering commands and may be configured as multiple virtual graphic processors that are used in parallel (concurrently) by a number of applications, such as application 236, executing in parallel.

Frame memory buffer 115 may be used for storing pixel data for each pixel of an output image. According to one embodiment, frame memory buffer may be a circular buffer configured to render (e.g., in combination with graphics processor 130) multi-dimensional graphics (e.g., 2D graphics, 3D graphics, etc.) associated with an application. In one embodiment, frame memory buffer 115 and/or other memory may be part of memory resident on client device 100 which may be shared with processor 125 and/or graphics processor 130. Additionally, in another embodiment, client device 100 may include additional physical graphics processors, each configured similarly to graphics processor 130. These additional graphics processors may be configured to operate in parallel with graphics processor 130 to simultaneously generate pixel data for different portions of an output image, or to simultaneously generate pixel data for different output images.

Exemplary Host Device

Figure 3:
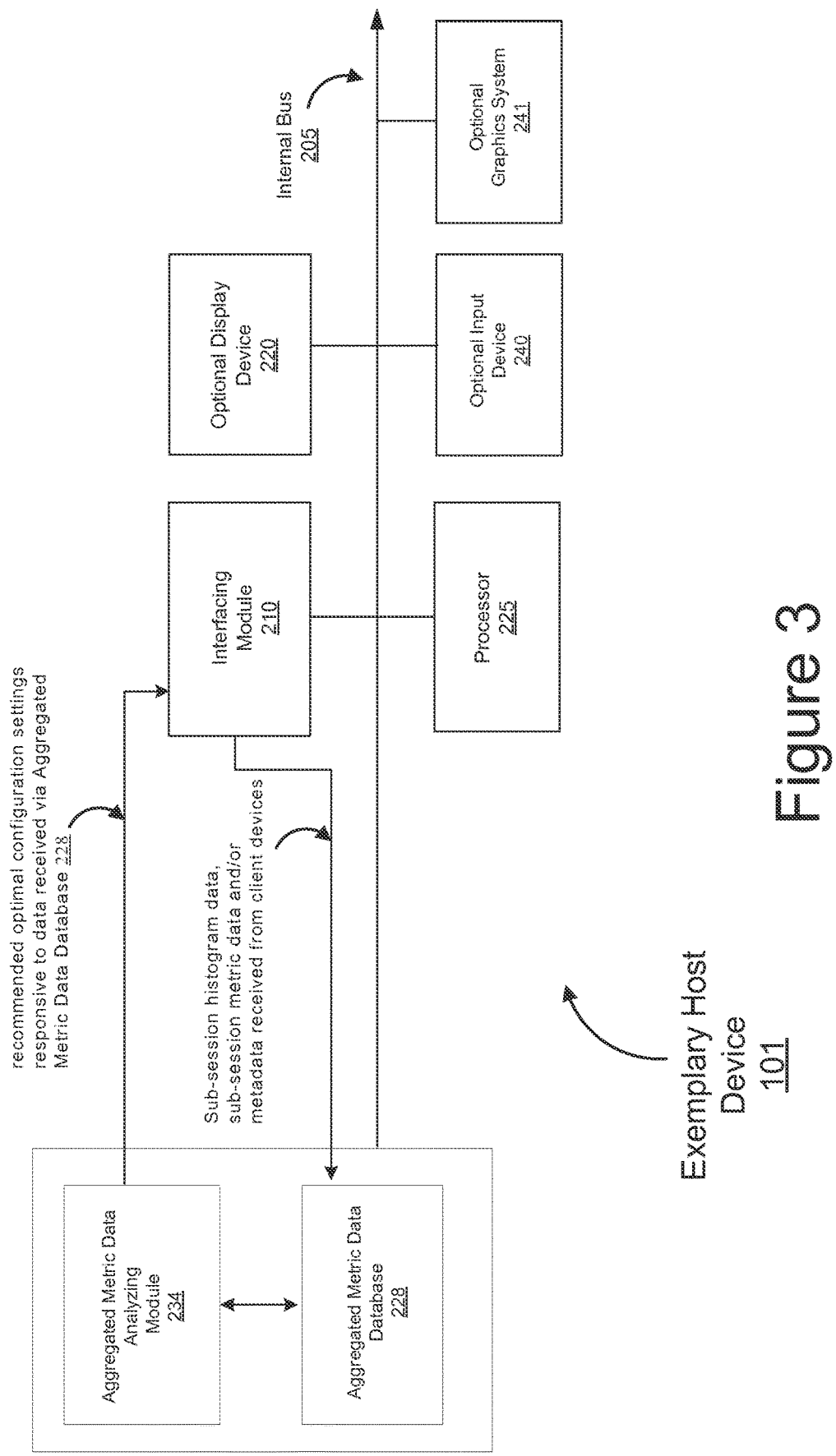
FIG. 3 depicts an exemplary host device capable of receiving and processing end-user metric data in accordance with embodiments of the present invention.

As presented in FIG. 3, an exemplary host system upon which embodiments of the present invention may be implemented is depicted. Exemplary host device 101 may be implemented as a server, laptop, desktop computer or the like, as contemplated by embodiments of the present invention. In one embodiment of the present invention, host device 101 may be a virtualized server device in a data center. According to one embodiment, host device 101 may include aggregated metric data analyzing module 234, aggregated metric data database 228, interfacing module 210, optional input device 240, processor 225, optional display device 220 and optional graphics system 241.

Interfacing module 210 may include the functionality to communicate with other computer systems (e.g., client device 100) via an electronic communications network (e.g., network 305), including wired and/or wireless communication and including the Internet. In one embodiment, interfacing module 210 may be configured to communicate with other computer systems (e.g., client devices) over a communications network during fixed time periods or varying time periods. According to one embodiment, interfacing module 210 may receive instructions from aggregated metric data analyzing module 234 to periodically communicate requests for client devices to provide log files generated locally on each client device containing application session data (e.g., application sub-session histogram data, application sub-session metric data, client device metadata, other forms of end-user metric data, etc.). For example, in one embodiment, requests made by aggregated metric data analyzing module 234 may include queries for client devices to provide the most recent log files generated. Accordingly, in one embodiment, log files received from each client device may be communicated to aggregated metric data database 228 for further processing.

Aggregated metric data database 228 may include the functionally to store end-user metric data received from client devices via interfacing module 210. In one embodiment, aggregated metric data database 228 may be configured to store application session data (e.g., application sub-session data) associated with different instantiations of an application (e.g. application 236) executed by a plurality of different client devices. In one embodiment, aggregated metric data database 228 may be operable to store applications sessions for different applications. According to one embodiment, aggregated metric data database 228 may be configured to store histogram data associated with an application sub-session. In one embodiment, aggregated metric data database 228 may be configured to store metric data used to generate the histogram data. Furthermore, in one embodiment, aggregated metric data database 228 may be configured to store metadata associated with each application sub-session as well as hardware and/or software configurations associated with each client device. For example, in one embodiment, metadata may include definitions concerning application game settings, hardware configuration information (e.g., version information, hardware setting information, etc.) and the like.

Aggregated metric data analyzing module 234 may include the functionality to receive and process data stored in aggregated metric data database 228. According to one embodiment, aggregated metric data analyzing module 234 may include the functionality to use aggregated histogram data gathered from client devices to determine acceptable and/or unacceptable performance levels for an application based on a particular hardware and/or software configuration associated with a client device. For example, in one embodiment, aggregated metric data analyzing module 234 may be configured to use data received from log files to perform acceptability tests for an application (e.g., application 236). In one embodiment, acceptable and/or unacceptable performance level determinations made by aggregated metric data analyzing module 234 may include subject feedback provided by users provided in metadata (e.g., user-defined minimum acceptable FPS rate for a hardware and/or software configuration associated with the client device used by the user).

Furthermore, based on aggregated sub-session histogram data, sub-session metric data and/or metadata received from client devices, aggregated metric data analyzing module 234 may be configured to determine a recommended optimal configuration settings for executing an application on a client device with respect to the client device's hardware and/or software configuration. As such, in one embodiment, aggregated metric data analyzing module 234 may include the functionality to send instructions to interfacing module 210 to communicate or broadcast recommended optimal configuration settings to each client device over a communications network.

Processor 225 may include the functionality to read and process instructions for running software applications and optionally an operating system. Optional input device 240 may be a device capable of receiving user input including, but not limited to, a keyboard, mice, joystick, and/or touch screen display, or the like. Optional graphics system 241 may comprise components similar to the graphics system of client device 100 (e.g., see FIG. 2). As such, optional graphics system 241 may include the functionality to generate a stream of rendered data to be delivered to client devices over a network. Furthermore, optional display device 220 may include the functionality to display output. Examples of optional display device 220 may include, but are not limited to, a liquid crystal display (LCD), a plasma display, cathode ray tube (CRT) monitor, etc.

Figure 4:
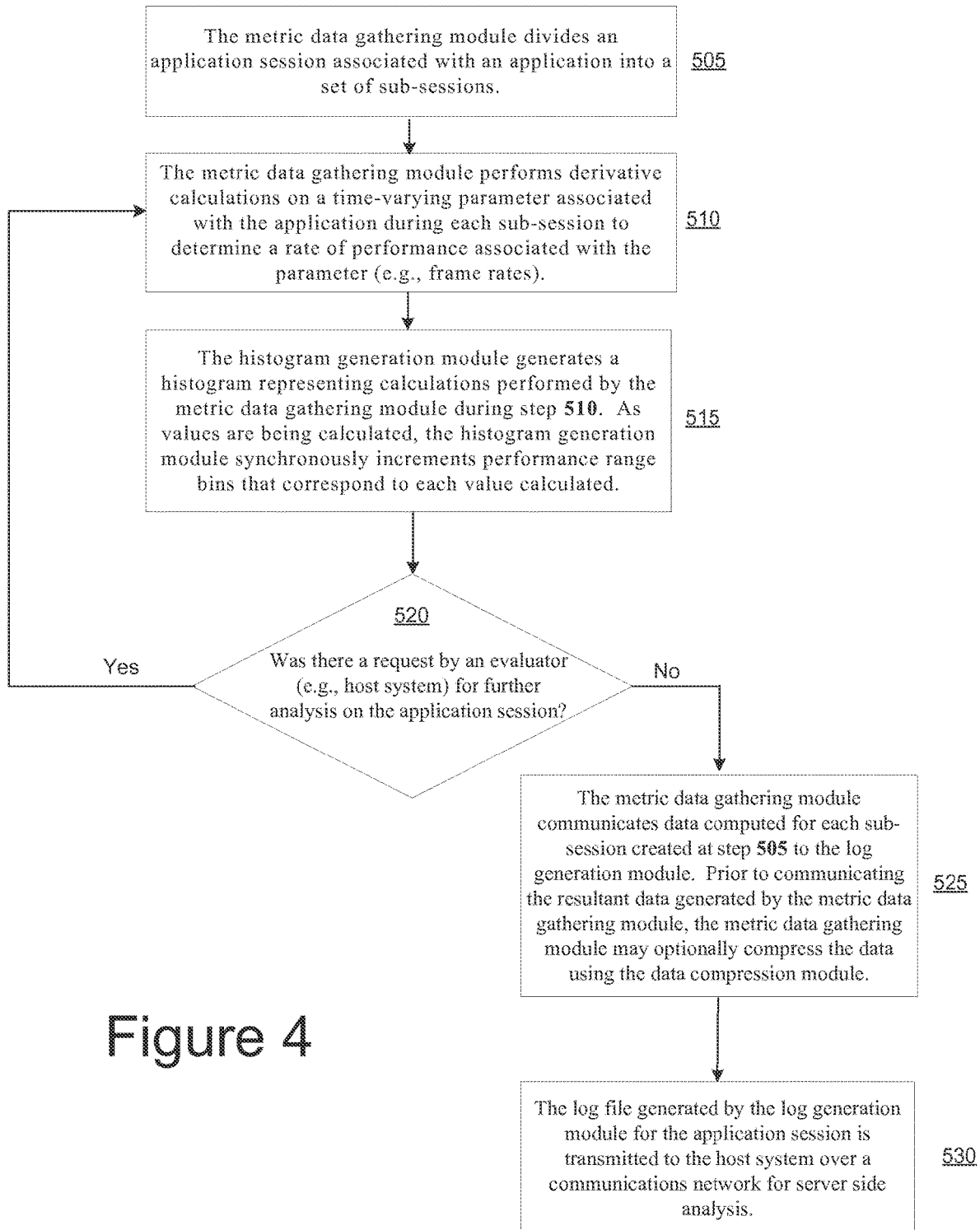
FIG. 4 is a flow chart depicting an exemplary computer-implemented process of gathering end-user metric data using a client device in accordance with embodiments of the present invention.

FIG. 4 is a flow chart depicting an exemplary process of gathering end-user metric data using a client device in accordance with embodiments of the present invention.

At step 505, the metric data gathering module divides an application session associated with an application into a set of sub-sessions.

At step 510, the metric data gathering module collects and measures time-varying parameter data (e.g., frame rates) associated with the application during each sub-session.

At step 515a, the histogram generation module generates a histogram representing calculations performed by the metric data gathering module during step 510. As values are being calculated, the histogram generation module synchronously increments performance range bins that correspond to each value calculated.

At step 515b, the histogram generation module optionally generates a separate histogram representing any first derivative calculations performed by the metric data gathering module during step 510. As values are being calculated, the histogram generation module synchronously increments performance range bins that correspond to each value calculated.

At step 515c, the histogram generation module optionally generates a separate histogram representing any $n^{th}$ order derivative calculations performed by the metric data gathering module during step 510. As values are being calculated, the histogram generation module synchronously increments performance range bins that correspond to each value calculated.

At step 520, the metric data gathering module communicates data computed for each sub-session created at step 505 to the log generation module. Prior to communicating the resultant data generated by the metric data gathering module, the metric data gathering module may optionally compress the data using the data compression module.

At step 525, the log file generated by the log generation module for the application session is transmitted to the host system over a communications network for server side analysis.

Figure 5:
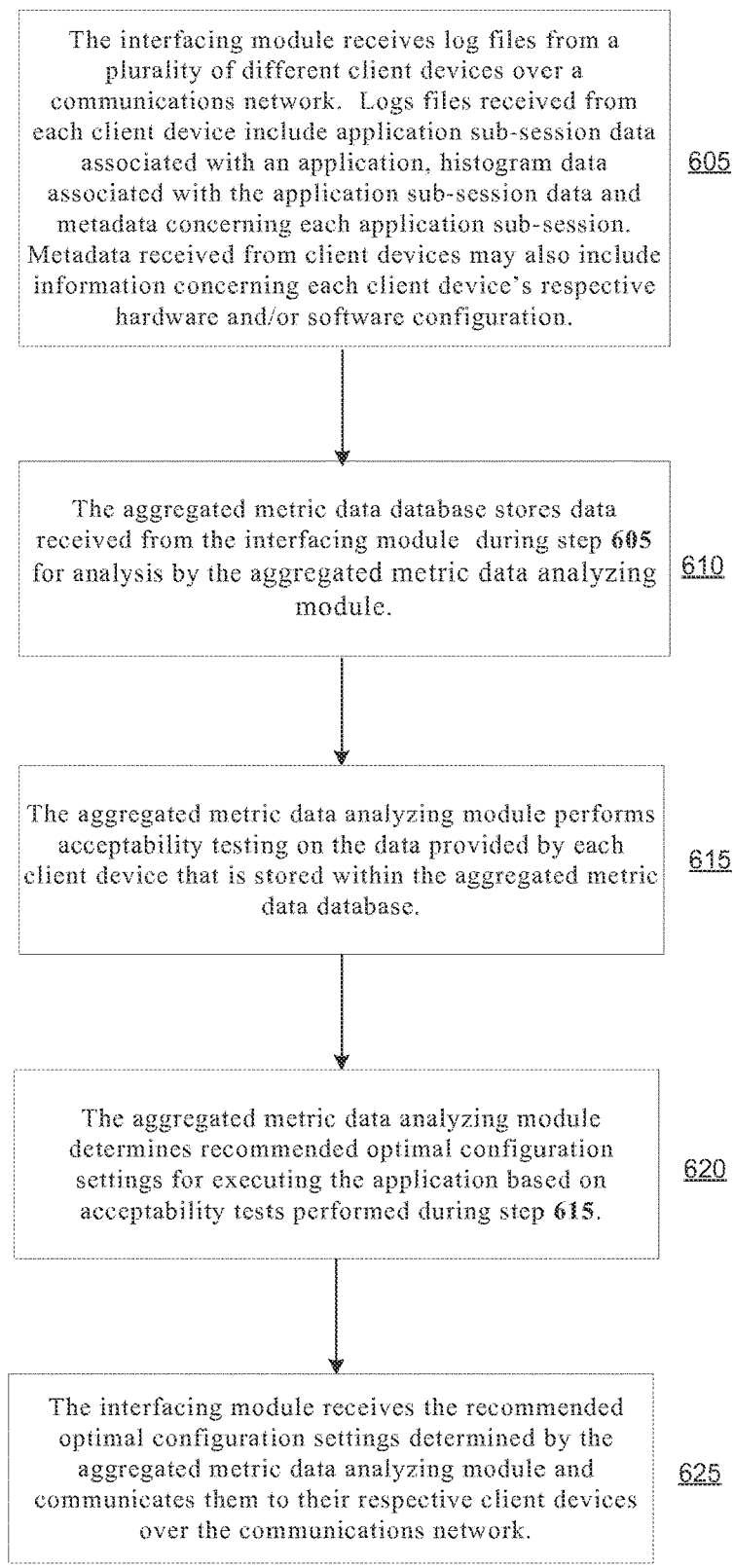
FIG. 5 is a flow chart depicting an exemplary computer-implemented process of receiving and processing end-user metric data received from a plurality of remote client devices in accordance with embodiments of the present invention.

FIG. 5 is a flow chart depicting an exemplary process of receiving end-user metric data associated with an application from a plurality of remote client devices and determining optimal configurations for executing the application in accordance with embodiments of the present invention.

At step 605, the interfacing module receives log files from a plurality of different client devices over a communications network. Logs files received from each client device include application sub-session data associated with an application, histogram data associated with the application sub-session data and metadata concerning each application sub-session. Metadata received from client devices may also include static information concerning each client device's respective hardware and/or software configuration.

At step 610, the aggregated metric data database stores data received from the interfacing module during step 605 for analysis by the aggregated metric data analyzing module.

At step 615, the aggregated metric data analyzing module performs acceptability testing on the data provided by each client device that is stored within the aggregated metric data database.

At step 620, the aggregated metric data analyzing module determines recommended optimal configuration settings for executing the application based on acceptability tests performed during step 615 as well as any static information concerning a client device's configuration during step 605.

At step 625, the interfacing module receives the recommended optimal configuration settings determined by the aggregated metric data analyzing module and communicates them to their respective client devices over the communications network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because much other architecture can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system.

These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
    using a client device, dividing an application session associated with an application into a set of sub-sessions;
    measuring a time-varying parameter associated with the application based at least in part on performance data associated with the time-varying parameter and gathered over time during each sub-session of the set of sub-sessions using the client device;
    sorting said performance data for each sub-session into a histogram;
    identifying, based at least in part on the histogram, one or more instances of micro stutter associated with the application session; and
    generating, based at least in part on the one or more identified instances of micro stutter and current configuration settings of the client device, updated configuration settings of the client device to cause an adjustment to the time varying parameter in the application session or a subsequent application session.

2. The method of claim 1, wherein the measuring further comprises performing a first derivative calculation on the performance data, wherein the first derivative calculation produces a first rate of performance for the time-varying parameter.

3. The method of claim 2, wherein the measuring further comprises performing a second derivative calculation using data associated with the first rate of performance to produce a second rate of performance, wherein said second rate of performance is an acceleration rate associated with the time-varying parameter.

4. The method of claim 1, wherein the sorting further comprises synchronously incrementing a histogram bin in real-time and responsive to the performance data gathered.

5. The method of claim 1, wherein the identifying the one or more instances of micro stutter includes:
    transmitting first data representative of the histogram and the current configuration settings to a host device remote from the client device; and
    receiving second data from the host device, the second data representative of update information corresponding to the client device, the update information generated based at least in part on the histogram and one or more histograms generated by one or more additional client devices other than the client device,
    wherein the generating the updated configuration settings of the client device is based at least in part on the second data.

6. The method of claim 1, wherein the time-varying parameter is associated with one of a frame rate or a rendering rate.

7. The method as described in claim 1, wherein said time-varying parameter is associated with a power consumption rate.

8. A system comprising:
    a data gathering module to:
        divide an application session associated with an application into a set of sub-sessions; and
        measure a time-varying parameter associated with the application by gathering performance data associated with the time-varying parameter over time during each sub-session of the set of sub-sessions;
    a histogram generation module to sort the performance data for each sub-session into a histogram;
    a log generation module to log data gathered by the data gathering module and the histogram generation module; and
    a configuration updater to:
        identify, based at least in part on the data, one or more instances of micro stutter associated with the application session; and
        update, based at least in part on the identified one or more instances of micro stutter, configuration settings of the system corresponding to the time-varying parameter.

9. The system of claim 8, wherein the data gathering module is further to perform a first derivative calculation on the performance data, wherein the first derivative calculation produces a first rate of performance for the time-varying parameter and the histogram generation module sorts the first rate of performance into the histogram.

10. The system of claim 9, wherein the data gathering module is further to perform a second derivative calculation using other data associated with the first rate of performance to produce a second rate of performance, wherein the second rate of performance is an acceleration rate associated with the time-varying parameter and the histogram generation module sorts the second rate of performance into the histogram.

11. The system of claim 8, wherein the histogram generation module is further to synchronously increment a histogram bin in real-time and responsive to said performance data gathered.

12. The system of claim 8, further comprising a communication module to:
    transmit the data to a host device remote from the client device; and
    receive additional data from the host device associated with the configuration settings,
    wherein the updating the configuration settings is based at least in part on additional data.

13. The system of claim 8, wherein the time-varying parameter is associated with one of a frame rate or a rendering rate.

* * * * *